3,558,785
AQUEOUS SOLUTION WITH HIGH CONTENT OF CALCIUM SUITABLE FOR VETERINARY USE AND METHOD TO PRODUCE SUCH A SOLUTION
Sven Axel Eriksson, Sodertalje, and Max Fischler, Enskede, Sweden, assignors to Aktiebolaget Astra, Sodertalje, Sweden, a Swedish company
No Drawing. Continuation-in-part of application Ser. No. 424,803, Jan. 11, 1965. This application Nov. 2, 1966, Ser. No. 591,436
Int. Cl. A61k 27/00
U.S. Cl. 424—317
8 Claims

ABSTRACT OF THE DISCLOSURE

A composition of matter of calcium gluconate, calcium lactate and calcium formate, in a molar ratio of 1:1:3.5, respectively. An aqueous solution made therefrom containing about 6 to 10 weight percent calcium and a method for treating paresis in ruminant animals by administering such composition are also disclosed.

---

This application is a continuation-in-part of our copending United States application Ser. No. 424,803, filed Jan. 11, 1965 now abandoned.

The instant invention relates to therapeutic calcium solutions for veterinary use, to a method of treating paresis in ruminant animals through the administration of an aqueous solution containing a calcium complex comprising calcium salts of certain organic acids, and to a method for preparing an aqueous calcium solution having a high calcium content.

Paresis in ruminant animals has heretofore been treated by the parenteral administration of solutions of certain calcium salts, e.g., calcium chloride. It is known that this condition is chemical in nature, and it is characterized by an abrupt decrease in the total calcium content of the body, particularly the concentration of ionized calcium. Accordingly, this condition is generally treated by intravenous administration of an aqueous solution containing calcium.

The use of solutions of calcium chloride has been found unsuitable since calcium chloride is relatively toxic and has been found to cause substantial irritation of the body tissues. It has also been found that the use of intravenous injections of calcium chloride solutions produces a very rapid increase in the level of calcium in the blood, thereby increasing the danger of shock. The use of calcium gluconate as a substitute for calcium chloride has been suggested and tried. This material has been found to be more acceptable in view of its lower toxicity and less irritating effect. However, the low solubility of calcium gluconate in water makes it impossible to prepare sufficiently concentrated solutions containing a therapeutically effective amount of calcium in a volume which can be easily administered by injection. Supersaturated solutions of calcium have been employed; but such solutions are not stable.

Combinations of calcium salts have been employed, for example, solutions containing 2% calcium lactate and 10% calcium gluconate have been prepared (Balasundaram et al., Indian Journal of Pharmacy, 13, 1951). These solutions correspond to a total calcium content of about 1.5%. It is also known that stable solutions may be obtained by preparing double salts with simple calcium salts, such as calcium chloride and calcium formate (German Patent Ser. No. 688,962).

It is an object of this invention to provide stable aqueous solutions having a high calcium content.

It is a further object of the invention to provide solutions comprising a calcium-containing complex formed by combining, in an aqueous solution, critical proportions of the calcium salts of certain organic acids.

Another object of the invention is to provide solutions having a calcium content which is high enough to provide a therapeutically effective dose of calcium in a single injectable volume.

A further object of the invention is to provide a method for the treatment of paresis which comprises administering an effective dose of an aqueous solution of a calcium-containing complex.

The term "high" as used herein in regard to the calcium content of aqueous solutions is intended to mean an amount of calcium which is at least about 5% based on the weight of the solution and preferably from about 5% to about 10% by weight.

These and other related objects can be achieved by preparing aqueous solutions having a high calcium content, e.g., from about 6% to about 10% calcium, by weight, in the form of a calcium complex obtained by dissolving a mixture comprising calcium gluconate, calcium lactate, and calcium formate within certain critical proportions.

In preparing solutions of the above-described calcium-containing complex, calcium gluconate, calcium lactate, and calcium formate are dissolved in water in a molar ratio of about 1:1:3.5, respectively, whereby a water soluble complex containing calcium is formed. The concentration of calcium in the resulting solution has been found to be between about 6% and about 10% by weight. It will be appreciated that the cold water solubility of calcium gluconate, calcium lactate, and calcium formate is about 3%, 5%, and 17%, respectively, and that such solubilities provide a calcium content of about 0.3%, 0.7%, and 5%, respectively. It is apparent that it is impossible to prepare stable solutions from one of these salts having a calcium content greater than about 5%.

Solutions of the calcium complex described above can be prepared by adding the salts, in the above molar ratio, to water, and heating the resulting admixture until all the salts have been dissolved. The solution is then cooled and filtered to remove impurities. The resulting solution is colorless, stable, and can be autoclaved. The salts are dissolved in a sufficient amount of water to provide the requisite concentration level of calcium, that is, from about 6% to about 10% by weight. The solutions obtained as described above, have been found to be stable, even after long periods of storage, and have a calcium content such that a therapeutically effective amount of calcium can be administered in a single dose, e.g., in a volume which does not exceed about 100 milliliters.

The solutions described above, have been found to be ideally suited for the treatment of paresis in ruminant animals. Such solutions provide a convenient means for the administration of therapeutically effective doses of calcium in a single injectable volume, i.e., in less than about 100 milliliters of solution which may be administered fairly rapidly without danger of shock resulting from a sudden rapid increase in the calcium level of the blood. Moreover, irritation of the body tissues such as is caused by calcium chloride is not encountered.

It has been found that the amount of phosphorus present in the blood is related to the calcium treatment of paresis in animals. Accordingly, the calcium complex solutions may contain small amounts of phosphorus, e.g., in the form of a hypophosphite or other suitable phosphorus compounds. Such solutions may also contain a suitable magnesium salt, or other desirable pharmacologically active compounds, which do not appreciably reduce the water solubility of either the calcium salts or the resulting calcium complex.

Although the formation of a complex comprising calcium gluconate, calcium lactate, and calcium formate in a molar ratio of about 1:1:3.5 is preferred, small variations in the content of the respective ingredients can be tolerated without reducing the total calcium content below about 6%. Thus, for example, a small excess of calcium gluconate may be present in the solution. It will be appreciated that if less than the proper amount of one of the ingredients is employed, proportionate parts of the other components do not enter into the complex, but they exist in the solution within the limits of their respective solubilities. Accordingly, the instant invention contemplates a solution which contains a major amount of the above-described complex, but which may contain, in addition, small amounts of the constituent calcium salts which are not in the form of a complex.

The following examples illustrate the principles and practice of the instant invention.

EXAMPLE 1

A mixture comprising 835 grams of calcium gluconate, 580 grams of calcium lactate, and 825 grams of calcium formate was added to a sufficient volume of water to make 5 liters of solution. The resulting mixture was stirred and heated to the boiling point to insure dissolution of all of the components. When all the salts were completely dissolved, the solution was cooled and filtered through a filter which removes pyrogens. The solution was then transferred into a series of 100 milliliter injection flasks having rubber stoppers which may be autoclaved at 120° C. for a period of about 20 minutes. The solution so obtained, contains about 8% calcium.

EXAMPLE 2

A mixture of 835 grams of calcium gluconate, 580 grams of calcium lactate, 825 grams of calcium formate, 150 grams of magnesium hypophosphite and 50 grams of nikethamide were mixed with sufficient distilled water to make 5 liters of solution. The mixture was stirred and heated to the boiling point in order to completely dissolve the salts. When all of the ingredients had been completely dissolved, the solution was cooled and filtered through a filter which removes pyrogens.

EXAMPLE 3

A total of thirty cows showing symptoms of paresis as described below were treated with a calcium complex solution as described in Example 2, above. One hundred milliliters of the solution were administered over a period of about 5 to 10 minutes in the jugular vein by means of a 100 milliliter syringe.

Eighteen of the cows showing symptoms of post partem paresis puerperalis got up, without relapse, within one-half hour after treatment. Two cows did not get up within the first half-hour after treatment, but did get up about 5½ hours after treatment. Another two cows got up easily after each administration, but relapsed once and twice, respectively.

A single cow showing symptoms of paresis puerperalis and prolapse of the uterus did not get up after the first treatment. However, after repositioning of the uterus and an additional injection of 100 milliliters of the test solution administered about 5 hours later, the cow got up spontaneously after an additional 3 hours.

Two cows showing symptoms of paresis puerperalis in connection with delivery, got up within 10 minutes after treatment before twin calves were delivered.

Another cow showing symptoms of ante partem paresis puerperalis got up easily after receiving 100 milliliters of the calcium complex solution. This cow delivered within 24 hours and suffered a relapse about 48 hours after delivery, but got up easily after another 100 milliliter injection of the calcium solution.

Another cow showing symptoms of ante partem paresis puerperalis and diarrhea was treated with 100 milliliters of the calcium solution and delivered about 12 hours later. When the cow relapsed after another 12 hours, a second dose was administered. The cow got up easily after both injections.

Three cows having symptoms of paresis (not connected with puerperium) and spouting diarrhea, got up easily, with only slight encouragement, within a half hour after administration of the medication. No relapse was noted.

EXAMPLE 4

One hundred and twelve cows showing typical symptoms of paresis puerperalis were treated with 100 milliliters of a calcium complex solution prepared as described in Example 2. The solution was administered by intravenous injection over a period of 2 to 5 minutes. Slight secondary side effects consisting of moderate muscle tremors and an increased pulse rate were observed. Ninety-five of the treated cows were cured after one treatment. An additional five cows recovered after the first treatment, but they relapsed again after one or more days. These five cows and an additional twelve cows, which showed no signs of recovery after one treatment, were given a second dose of 100 milliliters of the preparation, and all seventeen were cured.

EXAMPLE 5

Two hundred and twenty-five cases of paresis puerperalis and twenty cases of paresis not related to partus (hypocalcaemies) were treated with 100 milliliters of the preparation described in Example 2, above. The medication was injected intravenously over a period of 4 to 6 minutes into the jugular vein of animals having normal cases of paresis and into the mammillary vein of animals having severe cases. In all cases, administration of the medication was accomplished without complications.

Twenty of the cases of paresis puerperalis needed more than one treatment and four of the cases of paresis not related to partus needed more than one treatment.

EXAMPLE 6

Comparative testing was conducted in which 100 milliliters of a calcium complex solution prepared as described in Example 2, above, was compared with a commonly employed milk fever remedy comprising 15 grams of magnesium chloride, 15 grams of glucose, 40 grams of calcium hypophosphite and sufficient distilled water to make 1000 milliliters of solution. Each was injected intravenously into a single (respective) animal. The tests showed that the 100 milliliter dose of the calcium complex solution was as effective as 1000 milliliters of the conventional milk fever remedy.

What is claimed is:

1. A calcium containing complex of calcium gluconate, calcium lactate, and calcium formate in a molar ratio of about 1:1:3.5, respectively.

2. An aqueous solution containing from about 6 to about 10 weight percent dissolved calcium in the form of a water soluble complex of the calcium salts of gluconic acid, lactic acid, and formic acid, said salts being present in a molar ratio of about 1:1:3.5, respectively.

3. A method of preparing an aqueous solution containing from about 6 to about 10 weight percent calcium at room temperature which comprises dissolving calcium gluconate, calcium lactate, and calcium formate in water in a molar ratio of about 1:1:3.5, respectively; heating said solution to completely dissolve the salts; and subsequently cooling said solution.

4. A method of treating paresis in ruminant animals which comprises administering by injection a therapeutically effective dose of a calcium containing complex of calcium gluconate, calcium lactate, and calcium formate in water in a molar ratio of about 1:1:3.5, respectively.

5. A method of treating paresis in ruminant animals which comprises administering by injection a therapeutically effective dose of an aqueous solution containing from about 6 to about 10 weight percent of calcium in the form of a calcium complex, said complex comprising calcium gluconate, calcium lactate, and calcium formate in a molar ratio of about 1:1:3.5, respectively.

6. A method of treating hypocalcaemia in ruminant animals which comprises the administration by injection of a therapeutically effective dose of an aqueous solution containing from about 6 to about 10 weight percent of calcium in the form of a calcium complex consisting of calcium gluconate, calcium lactate, and calcium formate in a molar ratio of about 1:1:3.5, respectively.

7. A composition of matter consisting essentially of a water soluble complex consisting of calcium gluconate, calcium lactate, and calcium formate in a molar ratio of about 1:1:3.5, respectively, in water.

8. A composition for the preparation of high calcium content aqueous solution consisting essentially of calcium gluconate, calcium lactate, and calcium formate in a molar ratio of about 1:1:3.5, respectively.

References Cited

UNITED STATES PATENTS 2,794,764  6/1957  Albro et al. _____ 167—68B

OTHER REFERENCES

Merck Index, 7th ed., 1960, Merck & Co., Rahway, N.J., p. 193.

March, B. et al.: JAPA (Sci. Ed.), July 1952, vol. 41, p. 366–367.

Milks, H.: "Veterinary Pharmacology, Materia Medica & Therapeutics," 6th ed., 1949, p. 449–450.

ALBERT T. MEYERS, Primary Examiner

V. D. TURNER, Assistant Examiner

PO-1050
(5/69)

UNITED STATES PATENT OFFICE
CERTIFICATE OF CORRECTION

Patent No. 3,558,785                     Dated January 26, 1971

Inventor(s) Sven Axel Eriksson et al

It is certified that error appears in the above-identified patent and that said Letters Patent are hereby corrected as shown below:

Column 1, line 10, after "Ser. No. 591,436" insert -- , claims priority, application Sweden, January 20, 1964, 678/64; December 18, 1964, 15389/64 --.

Signed and sealed this 18th day of April 1972.

(SEAL)
Attest:

EDWARD M. FLETCHER, JR.
Attesting Officer

ROBERT GOTTSCHALK
Commissioner of Patents